United States Patent

DuBell et al.

[11] B 3,990,834
[45] Nov. 9, 1976

[54] COOLED IGNITER

[75] Inventors: Thomas L. DuBell, Maineville; Thomas C. Campbell, Cincinnati, both of Ohio

[73] Assignee: General Electric Company, Cincinnati, Ohio

[22] Filed: Sept. 17, 1973

[21] Appl. No.: 398,220

[44] Published under the second Trial Voluntary Protest Program on February 3, 1976 as document No. B 398,220.

[52] U.S. Cl. ............................ 431/264; 60/39.82 S; 431/263; 60/39.67
[51] Int. Cl.² ...................... F02C 7/18; F02C 7/26
[58] Field of Search ..... 60/39.67, 39.82 S, 39.82 N, 60/39.82 R; 431/263, 264; 317/82, 96–98

[56] References Cited
UNITED STATES PATENTS

| | | | |
|---|---|---|---|
| 2,693,082 | 11/1954 | Arthur | 60/39.67 |
| 2,831,993 | 4/1958 | Lentz | 60/39.82 S |
| 2,840,742 | 6/1958 | Watters | 60/39.67 |
| 2,865,441 | 12/1958 | Coupe | 60/39.82 S |
| 3,057,159 | 10/1962 | Benedict | 60/39.82 S |
| 3,330,985 | 7/1967 | Johnston | 60/39.82 S |
| 3,736,748 | 6/1973 | Walker et al. | 60/39.67 |

FOREIGN PATENTS OR APPLICATIONS

| | | | |
|---|---|---|---|
| 1,239,216 | 10/1959 | France | 317/98 |
| 875,342 | 8/1961 | United Kingdom | 60/39.82 R |

*Primary Examiner*—C. J. Husar
*Assistant Examiner*—Robert E. Garrett
*Attorney, Agent, or Firm*—Henry J. Policinski; Derek P. Lawrence

[57] ABSTRACT

A combustion chamber is provided with a fuel source and an igniter for initiating combustion. The igniter projects into the combustion chamber and into proximity with the fuel source. A heated tip portion of the igniter initiates burning and is cooled by means of cooling air passing through a plurality of air passages defined by a plurality of channels near the external surface of the igniter housing and further defined by a surrounding ferrule. Certain of the channels extend axially of the housing while at least one channel extends circumferentially thereabout and intersects the former channels. An opening in the ferrule provides communication between preselected of the channels and the interior of the combustion chamber. Cooling air passes through the channels in the axial direction (relative to the igniter) and is collected by the circumferential channel whereupon it is exhausted through the ferrule opening generally normally to the igniter housing and toward the downstream direction therefrom within the chamber.

7 Claims, 5 Drawing Figures

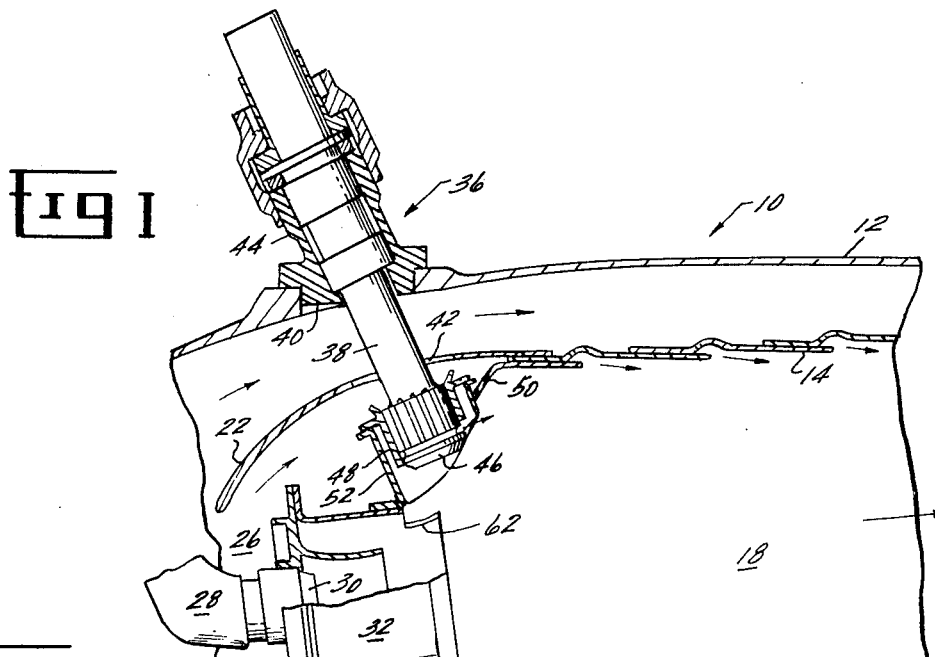

COOLED IGNITER

BACKGROUND OF THE INVENTION

The present invention relates to fuel igniters for use in combustion chambers and more particularly to improved methods for providing cooling thereof.

Combustion systems for use in gas turbine engines associated with airplanes have been recently subjected to increasingly stringent exhaust emission control. Exhaust from such an engine must be relatively smokeless and include very low quantities of unburned fuel. In order to accomplish these ends, the combustion system must accomplish almost perfect burning.

On the other hand, the combustion system, like the remaining engine elements, must be designed to provide extended reliable service as well as high efficiency operation. Unfortunately, the latter characteristics are substantially antagonistic to the foregoing exhaust emission goals.

In order to thoroughly burn fuel, various means have been devised to atomize incoming fuel to extremely fine droplet sizes. An igniter is disposed in relative proximity to the atomized fuel exiting the atomizer. This disposition of the igniter results in its being projected into the area defining the primary combustion zone downstream of the atomizer. The presence of fuel-rich air around portions of the igniter result in a high rate of heat transfer into the igniter from the combustion process. Furthermore, an intense flame is frequently stabilized directly upon the igniter downstream surface. Heat transferred to the igniter in these fashions results in premature failure of the igniter, destruction through burning of associated supporting ferrules, and severe damage to the combustion chamber liner portions disposed within the wake of the flame thus stabilized.

Previous attempts at solving these problems have included the injection of cooling air into the ferrule regions surrounding a portion of the igniter, retraction of the igniter to a position more remote from the incoming atomized fuel, improving igniter construction materials, changing the igniter shape, and installing grooves in the igniter to discharge cooling air radially into the combustion zone. Each of these attempts has been partially successful but has in some way failed to achieve its intended purpose, and several have also operated to reduce the combustion ignition capability of the engine. More particularly, retraction of the igniter leads to difficulty in initiating burning due to the absence of fuel at the igniter firing tip. Changing of the igniter tip shape has aided somewhat but has not served to detach the flame stabilized thereon and has also led to weakened igniter structure. Improving the igniter construction materials is always beneficial to igniter life, but supplementary action will further improve combustion system operation. The installation of external grooves in the igniter to discharge air radially into the combustion zone serves effectively to reduce the igniter temperature but unfortunately disturbs flow fields and hampers ignition capability.

SUMMARY OF THE INVENTION

It is therefore an object of the present invention to provide an improved igniter cooling means which serves to reduce igniter temperatures, to destabilize flame fronts from the area proximate the heated igniter tip and to accomplish these goals without adversely affecting combustion efficiency or structural integrity of the igniter.

To accomplish this as well as further objectives which will become apparent hereinafter, the present invention provides an igniter having a generally cylindrical housing configuration which extends radially into the combustion chamber and bears a heated tip or radially inward extremity. A portion of the region of the housing near the tip projects through a generally cylindrical and annular ferrule. A plurality of axial air passages are formed inside the ferrule by defining channels within the external surface of the igniter housing. A circumferential channel is defined in the housing surface which, together with the ferrule, defines an air passage which is adapted to receive cooling air from the foregoing axial passages. The ferrule is provided with an opening at its downstream extremity which is adapted to exhaust the cooling air into the combustion chamber in a stream normal to the igniter housing.

BRIEF DESCRIPTION OF THE DRAWING

The present invention will be more clearly understood upon reading the detailed disclosure which follows, taken in conjunction with the appended drawings wherein;

FIG. 1 illustrates an igniter according to the present invention disposed in operating relationship within a combustion chamber of a gas turbine engine;

FIG. 2 is an enlarged view of a portion of the igniter structure of FIG. 1;

FIG. 3 is a cross-sectional view of the igniter tip area taken along line 3—3 of FIG. 2;

FIG. 4 is a cross-sectional view of significant structure of the present invention taken along line 4—4 of FIG. 3; and FIG. 5 is an enlarged perspective view of the ferrule of the present invention.

DETAILED DESCRIPTION OF A PREFERRED EMBODIMENT

While the present invention will be described hereinafter in terms of a combustion chamber for a gas turbine engine, it is clear that the igniter structure is readily adaptable to many other applications wherein high efficiency, high temperature and extended life are requirements.

FIG. 1 depicts the present invention disposed in its usual environment. A combustion chamber, designated generally at 10, includes an outer casing 12 and a combustion chamber liner 14. The liner 14 combines with a similar liner 16 to define a combustion zone 18. A radially inward casing 20 defines the combustion chamber from its inward side. An upstream extension 22 of line 14 combines with a similar extension 24 of liner 16 to define a "dome" of the combustion chamber.

The dome thus defined provides an inlet 26 through which compressed air is directed for the purpose of supporting combustion. In addition, a fuel source 28 penetrates the dome and terminates in a nozzle 30 adapted to emit an atomized spray. The surrounding cup structure 32 operates to further atomize the fuel and mix it with air entering inlet 26 to result in the emission of a conical-shaped combination of atomized fuel and air flow.

In order to initiate burning of the fuel and air mixture, an igniter designated 36 is provided. This igniter incorporates a generally cylindrical housing 38 which penetrates the combustion chamber by means of an aperture 40 through casing 12 and an aperture 42 through wall 22. The housing 38 projects from a point external of the combustion chamber 10 to a point proximate the downstream extremity of the cup structure 32. (Throughout this specification, the words "upstream" and "downstream" relate to the directions of flow within the combustion chamber and are synonymous with the directions left and right, respectively, in FIG. 1.)

For the purpose of retaining the igniter in position, a mounting structure 44 of typical configuration is provided which interlocks the igniter 36 with casing 12. When properly positioned, the igniter is disposed with its heated tip portion 46 in close proximity to the outlet of the cup 32. The tip may be heated by electrical discharge or other similar and typical fuel igniting phenomenon. In order to maintain the tip 46 in position, a generally cylindrical ferrule 48 having an annular cross section is provided which is adapted to receive and retain the tip portion 46 by frictional engagement. The ferrule is supported by a structural member 50 extending radially inwardly from liner 14 and a second structural member 52 extending radially outwardly from the cup 32.

Referring now to FIG. 2, the portion of FIG. 1 in the area of the igniter is enlarged. The elongated cylindrical housing 38 as depicted, includes several steps or radius changes dictated largely by structural considerations. The ferrule 48 can be seen to include a flared portion 60 to ease positioning of the igniter as well as to assist in directing cooling air through the ferrule, as will be described hereinafter. As can be more clearly seen from FIG. 2, the igniter housing 38 extends generally radially into the combustion chamber and presents the heated tip 46 comprising its radially innermost termination to a point immediately adjacent the cup 32. The ferrule 48 can be seen to surround a predetermined portion of the housing 38 proximate the heated tip 46. Access of the igniter to the cup 32 is enhanced by a cut-away portion 62 by which the heated tip 46 is presented directly to the fuel air mixture at the interior of the cup. Thus, the igniter of the present invention is disposed in a fashion which would lead to the high rate of heat transfer to, and adherence of a flame front to the housing and ferrule structure (as described as being problematical hereinabove).

Since the igniter is thus otherwise susceptible to the damage and disadvantages associated with the prior art as described, means are provided by the present invention for cooling the igniter near the heated tip thereof and for preventing flame attachment to the igniter and ferrule structure as well as prevention thereby of damage to the liner portion in the wake of the igniter.

As shown with detail in FIGS. 2, 3, 4 and 5, the igniter is provided with a plurality of interior air passages 72 which extend from openings 74 to outlets 76 in the igniter tip itself. These passages 72 define routes for cooling air to pass through the tip structure and provide cooling thereto. To this extent, the igniter tip is similar to those of various prior art configurations.

To supplement the action of the cooling air thus coursing through the interior of the igniter structure, the present invention provides a plurality of channels 80 defined in the external surface of the cylindrical housing 38. These channels combine with the ferrule 48 to define a plurality of air passages extending axially of the cylindrical housing 38. The channels can be formed as grooves in the cylindrical housing surface or by means of upstanding ribs disposed to either side of each channel. The latter structure is depicted in the present embodiment with the ribs designated 82. The air passages formed by the cooperation of channels 80 and the ferrule 48 are designated 84.

In the present embodiment, the channels 80 are generally axial with respect to housing 38 and are spaced circumferentially about the igniter housing structure. In addition, the channels are substantially parallel with one another. The channels extend from a point near the outward extremity of the ferrule (the flared portion 60) to a point within the ferrule. (The outward openings of the channels form inlets 86). Within the ferrule, a circumferential channel 88 is defined immediately adjacent the heated tip which intersects each of the axial channels 80.

The circumferential channel 88 combines with the ferrule 48 to define a generally toroidal air passage having a plurality of points of communication to the passages 84 formed by channels 80.

In other words, each of the axial channels extends from its inlet 86 radially inwardly of the combustion chamber to and communicates with circumferential channel 88.

At its radially interior end, the ferrule 48 is generally planar but includes an interruption 70 in the circumference thereof at the downstream side which interruption comprises an opening into the combustion chamber. The opening, according to the present invention, is generally radial with respect to the housing 38.

The opening or indentation 70 in the ferrule 48 serves to expose a portion of the channel 88 and preselected of the axial channels 80, in part, to the interior atmosphere of the combustion zone 18. With the exception of these areas, the ferrule serves to isolate and substantially seal the remaining channels and associated passages from the combustion zone.

During engine operation, the igniter cooling system of the present invention functions as follows. As fuel enters nozzle 30 and is atomized by and combined with air in cup 32, the igniter tip heats the fuel to the point of combustion and creates a flame front. For the purpose of cooling igniter tip 46, a quantity of cooling air entering inlet 26 is bypassed around the primary air inlet within cup 32 to the igniter structure within the dome defined by wall 22. A portion of this diverted air enters the flared portion 60 of the ferrule 48 and is directed thereby into the axial air passages 84 defined by the channels 80 in the ferrule. This air traverses the length of these passages and absorbs heat from the igniter by convective heat transfer from the housing 38. Upon reaching the axial ends of the passages 84, the air is collected within circumferential channel 88. Since the ferrule isolates these various passages from the exterior environment, except for the generally radial opening formed by indentation 70, the air thus collected within channel 88 passes through the opening and into the combustion zone 18 downstream of the igniter and generally normally to the housing 38. Other air escape from inside the ferrule is prevented by its frictional contact with the ribs 82. Thus, the present invention achieves convective cooling of the external igniter surfaces and an exhausting of the flow of cooling air from the downstream side of the igniter in a direction generally perpendicularly to the igniter.

The cooling provided by the present invention supplements the internal cooling provided by passage of air through the internal air passages 72 as described above. Furthermore, the present invention, in providing means for expelling the cooling air in a direction downstream of the igniter and generally normally thereto, achieves cooling with the beneficial result that ignition characteristics and fuel air mixture flow are not adversely affected. In addition, the perpendicular expulsion of the cooling air prevents the adherence or stabilization of a flame front to the igniter and ferrule structure, due to the elimination of a base pressure region about the igniter and ferrule region. Furthermore, these beneficial results are attained without the necessity of reducing mechanical stability of the igniter by changing its overall shape.

In summary, the present invention provides improved structural integrity by achieving effective igniter cooling without compromising either operating efficiency or structural characteristics.

While the present invention has been described with particular reference to one embodiment, it is clear that numerous variations of this embodiment may be made by those skilled in the art without departing materially from the scope of the present invention. For example, it has already been stated that the channels defined in the surface of the igniter housing may be formed by creating grooves in the surface or defining ribs at spaced positions. Similarly, the important characteristic of the cooling air exhaust opening from the ferrule is not its shape but its function as directing cooling air substantially radially and downstream of the igniter so as to avoid interplay with the fuel-air mixture while preventing flame attachment. Variations in the character of this opening may be made without departing from these inventive concepts. Still further, a separate ferrule is not required for operation of the present invention. An integrated ferrule-like design would serve equally well. Other such variations will be apparent to those skilled in the art.

What is claimed as new and desired to be secured by Letters Patent of the United States is:

1. In a fuel igniter for use in a combustion chamber, the igniter comprising a cylindrical housing projecting generally radially into the combustion chamber, the housing terminating in a heated tip extending through a generally annular ferrule, the improvement comprising:
   a plurality of first channels spaced circumferentially about the outer surface of said housing and aligned generally axially thereof;
   a circumferential second channel formed within the outer surface of said housing proximate said heated tip and intersecting preselected of said first channels;
   first means for providing a flow of cooling air to said first channels;
   second means for collecting said cooling air within said second channel; and
   third means for exhausting said cooling air from said second channel generally normally of said housing and substantially only in a direction downstream thereof into said combustion chamber.

2. The improvement of claim 1 wherein:
   preselected of said first channels originate at a point of said housing proximate the radially outermost extremity of said ferrule, and said second channel is disposed substantially within said ferrule, said first and second channels combining with said ferrule to define air passages.

3. The improvement of claim 2 wherein said third means comprises an opening in said ferrule providing communication between preselected of said air passages and said combustion chamber.

4. The improvement of claim 3 wherein said opening is generally radial with respect to said housing, and is disposed to the downstream side thereof within the combustion chamber.

5. A fuel igniter for use in combustion chambers, the igniter comprising:
   an elongated housing extending generally radially from a point outside the chamber to a point within the chamber;
   a heated tip proximate the extremity of the housing radially innermost of the chamber;
   a ferrule of predetermined length surrounding a portion of said housing near said tip and receiving said housing in frictional engagement;
   a plurality of axial channels generally parallel to one another and spaced circumferentially of said housing for passing cooling air along the external surface of said housing axially thereof within said ferrule;
   a circumferential channel formed within and circumscribing said housing for collecting said cooling air within said ferrule near said tip; and
   means for expelling said cooling air into said combustion chamber substantially only in a direction downstream of said tip and generally normally to said housing.

6. The igniter of claim 5 wherein said expelling means comprises an opening in said ferrule disposed toward the downstream portion thereof and directed generally normally to the housing.

7. The igniter of claim 6 wherein:
   said ferrule is generally cylindrical and is annular in the cross section and has a generally planar extremity radially inward of the combustion chamber, and wherein
   said opening comprises an indentation in said inward extremity at the downstream portion thereof, said indentation exposing a portion of said circumferential channel and portions of preselected of said axial channels to the chamber interior.

* * * * *